United States Patent [19]

Hilgers et al.

[11] 4,140,225

[45] Feb. 20, 1979

[54] SHEET MATERIAL STORAGE RACK

[75] Inventors: William H. Hilgers; Owen F. Martin, both of Santa Maria, Calif.

[73] Assignee: The United States of America as represented by the Secretary of the Air Force, Washington, D.C.

[21] Appl. No.: 820,493

[22] Filed: Jul. 29, 1977

[51] Int. Cl.$^2$ .............................................. A47F 7/00
[52] U.S. Cl. ...................................... 211/162; 211/46
[58] Field of Search .................... 211/162, 46, 94, 41, 211/94.5; 206/449, 454; 269/297

[56] References Cited

U.S. PATENT DOCUMENTS

| | | | |
|---|---|---|---|
| 1,841,620 | 1/1932 | McCoy | 211/46 |
| 2,076,848 | 4/1937 | Kiever | 211/162 X |
| 2,547,368 | 4/1951 | Booth | 211/46 X |
| 2,618,905 | 11/1952 | Dicks et al. | 269/297 |
| 2,928,550 | 3/1960 | Stobie | 211/46 |
| 3,883,004 | 5/1975 | Slaga | 211/162 |
| 4,036,370 | 7/1977 | Chevalier | 211/46 X |

FOREIGN PATENT DOCUMENTS 2248939  1/1974  Fed. Rep. of Germany ........... 206/454

*Primary Examiner*—James T. McCall
*Assistant Examiner*—Robert W. Gibson, Jr.
*Attorney, Agent, or Firm*—Joseph E. Rusz; Arsen Tashijian

[57] ABSTRACT

A storage rack suitable for maintaining sheet material free of surface scratches, dents, dings, etc. caused by handling and moving. A rectangular frame as large as the largest sheet to be stored is suspended from an overhead monorail. A channel member forming the lower edge of the frame supports the sheets which lean against the frame and are held in place by diagonal straps. A plurality of parallel overhead rails each of which supports a single frame provide the storage area. The overhead rails are at least twice the overall length of the frames to allow a selected frame to be moved from its storage position into the open where a desired sheet may be removed or added and the frame pushed back to its stored position without chance of damage to the sheet.

3 Claims, 4 Drawing Figures

SHEET MATERIAL STORAGE RACK

STATEMENT OF GOVERNMENT INTEREST

The invention described herein may be manufactured and used by or for the Government for governmental purposes without the payment of any royalty thereon.

BACKGROUND OF THE INVENTION

This invention relates to a rack for storing and handling sheet material and, more particularly, the invention is concerned with providing a storage rack for safely handling mirror finished sheet material and eliminating potential damage from storage procedures and processing during fabrication.

Heretofore, it has been common practice to store sheet material horizontally in stacks with separators between the sheets and means for holding the material in position. However, due to the weight and size of the sheets, considerable damage can be caused to the surfaces of the sheets during the stacking and unstacking process. The sheets are often rubbed against each other causing damage such as bending and scratching and otherwise marring the surface. In a situation where a perfect mirror surface is required on the sheet material, the handling and storage procedure is critical and a considerable amount of stock can be waster if the material is not handled properly.

Another method previously used to store sheet material was to stand the sheets on one edge. Usually a grooved or slotted base was provided and a single sheet was held in each slot. In order to remove one sheet from a large number held in one storage area, it was necessary to slide the sheet out from between the others. Very often during the sliding out operation, contact would be made with adjacent sheets resulting in damage and rejection of the sheet and loss of time as well as increasing cost of fabrication.

The hereinafter described invention overcomes the abovementioned drawbacks and provides an arrangement whereby sheet material can be maintained free of any flaws such as surface scratches from handling and movement, dings, dents from sorting during storage. The individual sheets are segregated and cushioned to eliminate potential damage from storage procedures as well as processing during fabrication. The space requirements for sheet storage is minimal and any particular sheet can be easily and simply retrived without disturbing other sheets and without danger of scratching or denting.

SUMMARY OF THE INVENTION

The present invention is concerned with providing a storage rack for safely and expeditiously handling highly polished sheet stock. A plurality of rectangular frames are suspended from overhead monorails for movement therealong to allow the frames to move from the storage position to the open accessible position. The sheets are supported by a channel member which forms the lower edge of the frame and a pair of diagonally oriented straps hold the sheet against the carpeted surface of the frame. The sheets are added or removed by rolling the frame out to the open position, loading or unloading, and rolling the frame back into the storage position. No sliding contact is made between the sheet and the frame or with any of the other sheets on the rack.

Accordingly, it is an object of the invention to provide a storage rack for sheet material wherein the material can be stored and removed without scratching, denting and/or dinging the surface thereof.

Another object of the invention is to provide a sheet material storage rack wherein quality assurance rejections due to material condition are obviated, thereby eliminating expensive duplication efforts after rejection and scrapping of the product occurs.

Still another object of the invention is to provide a sheet metal storage rack wherein the individual sheets of metal stock are segregated and cushioned with carpeting for the contact surfaces and wood for the leading edges.

A further object of the invention is to provide a sheet metal storage rack which simplifies the handling requirements for mirror finished sheet metal stock and eliminates potential damage from storage procedures as well as processing during fabrication.

A still further object of the invention is to provide a sheet material storage rack wherein the space requirements for sheet material stock storage is minimal and reduced and the number of racks fabricated depends upon the amount of storage required.

Another still further object of the invention is to provide a storage rack which is adaptable for heavy sheet stock storage with simple modification such as a lateral suspension rail and roller assembly of stronger material with an I beam or T beam and roller bearings.

These and other objects, features and advantages will become more apparent after considering the following detailed description taken in conjunction with the annexed drawings and appended claims.

DECRIPTION OF A PREFERRED EMBODIMENT

Figure 1:
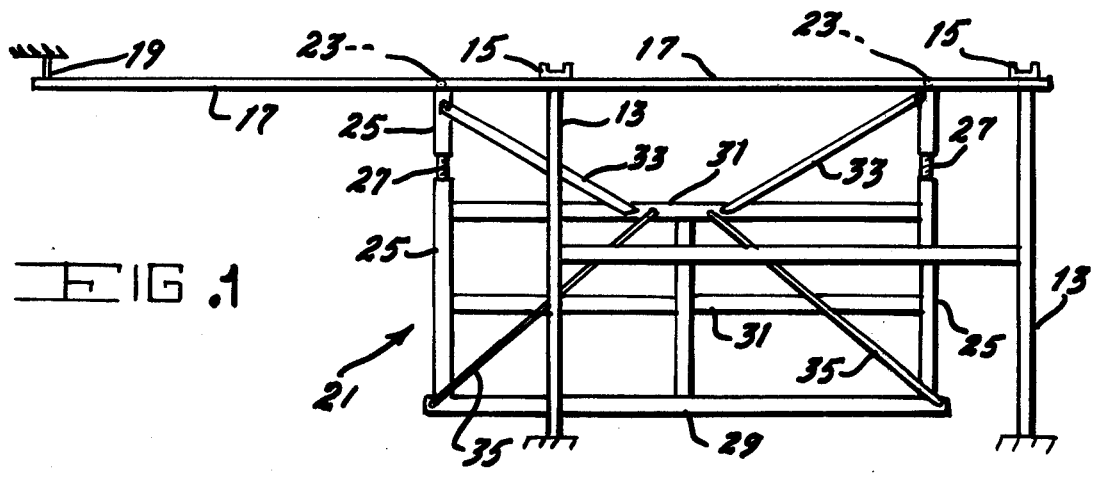
FIG. 1 is a side view of one frame of the storage rack according to the invention partially out of storage position showing the vertical supports and the overhead rail.
Figure 2:
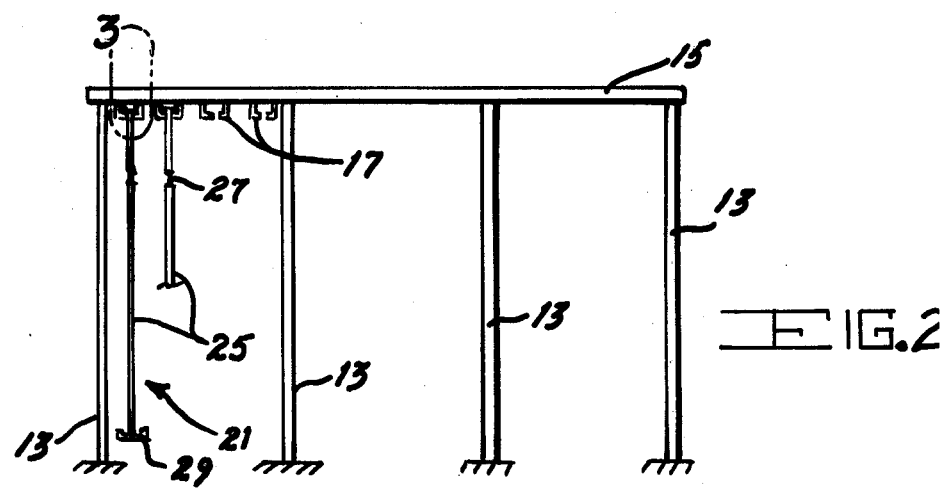
FIG. 2 is an end view of the storage rack showing the vertical supports and the cross channel with the overhead rails attached and the frame suspended therefrom.

Referring now to the drawings, there is shown a storage rack according to the invention including a series of upright vertical supports 13 which support the cross channels 15. A series of parallel, closely spaced, overhead rails 17 are fixedly attached to the lower surface of the cross channels 15 and extend from the back of the rack outwardly beyond the front of the rack to a ceiling support 19 which holds the outer end of the rail 17 in position. The overhead rails 17 are at least twice the overall length of the main portion of the rack.

Figures 3, 4:
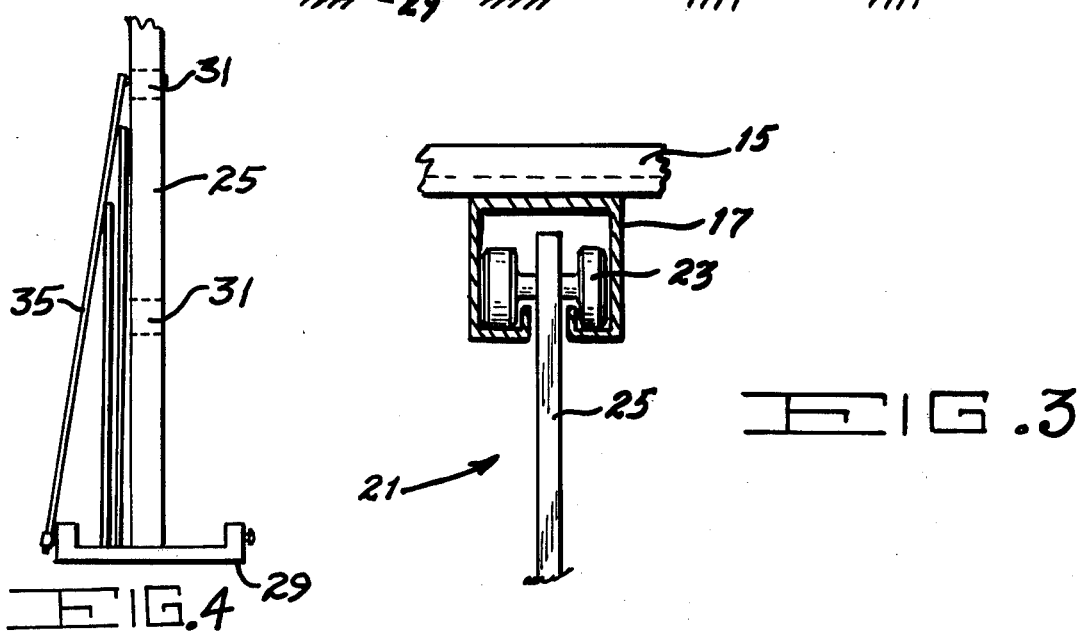
FIG. 3 is an enlarged view in detail of the circled 3 area in FIG. 2 showing the overhead rail with the rollers in place for moving the frame along the rail.
FIG. 4 is an enlarged end view of the lower portion of one of the rectangular frames showing flat material stored therein.

A rectangular frame generally designated by the reference numeral 21 is suspended from the overhead rail 17 for movement therealong. The frame 21 includes overhead rollers 23 (see FIG. 3) which engage the rail 17 and provide low friction movement for the frame 21 along the rail 17. The frame 21 includes the upright legs 25 which are provided with adjustment means 27. The rollers 23 are attached to the upper end of each upright leg 25. A wide channel base 29 is positioned between the lower ends of the upright legs 25 to complete the rectangular frame 21. The cross members 31 and the diagonal braces 33 serve to strengthen the frame 21 as well as support the sheet material which is stored therein. A pair of straps 35 are provided for holding the sheets against the frame while resting on the channel 29.

In use, the frame 21 is rolled out into the open position (to the left in FIG. 1). The straps 35 are removed and a sheet of material (not shown) is placed so that its lower edge rests upon the wide channel base 29 and the sheet is leaned back into contact with the side of the frame 21 which is carpeted. The straps 35 are reattached and the frame 21 is pushed back into the storage position. To retrive the stored sheet, the above procedure is reversed.

Although the invention has been illustrated in the foregoing specification in terms of a preferred embodiment thereof, the invention is not limited to this embodiment or to the particular configuration shown and described. It will be apparent to those skilled in the art that certain changes, modifications and substitutions can be made, particularly with respect to the shape and positioning of the elements without departing from the true spirit and scope of the appended claims. Also, it can be seen that the invention has many uses where it is necessary to store large sheets of flat material, such as, glass, plywood, alumclad, plastics, etc. since the storage rack permits quick retrieval of the stored item with a minimum of effort without any potential damage to other items in storage.

Having thus set forth the nature of our invention, what we claim and desire to secure by Letters Patent of the United States is:

1. A storage rack for maintaining polished sheet material free of surface imperfections while allowing easy storage and retrieval of the sheet material, said storage rack comprising, a plurality of upright support members spaced across the front and back of said rack and anchored to the floor, first and second cross channels attached to the tops of said upright support members, the first of said cross channels being disposed across the back of said rack and the second of said cross channels being disposed across the front of said rack, a series of parallel closely spaced overhead rails fixedly attached to said cross channels, the rearward ends of said rails being attached to the first cross channel at the back of the rack, the central portion of said rails being attached to the second cross channel at the front of the rack, the forward end of said rails being fixedly attached to a ceiling support, said rails being about twice the length of the rack from back to front, a rectangular frame for holding sheet material suspended from each of said overhead rails for linear movement therealong, said rectangular frame including two upright legs extending downward from one of said rails, a wide channel base positioned between the lower ends of said legs for holding the sheet material on the frame, a cross member positioned across said legs near the center of the frame, diagonal braces attached between the upper part of each of said upright legs and the center of said cross member, and a pair of straps extending from the outer ends of said channel base to the center of said cross member, the sheet material being positioned behind said straps and thereby held in place, said rectangular frame being equal in length to the length of the rack from back to front, and means for reducing the friction between said frame and said rail during movement into and out of said rack to store and retrieve the sheet material on said frame.

2. The storage rack defined in claim 1 wherein said upright legs are adjustable as to length to maintain the desired floor clearance.

3. The storage rack defined in claim 1 wherein the means for reducing the friction between said frame and said overhead rail during movement into and out of said rack includes a roller positioned on each side of the top of each of said upright legs, each of said rollers engaging a channel on each side of said rail to permit easy rolling movement along the length of the rail.

* * * * *